US011166082B2

(12) United States Patent
Farrell et al.

(10) Patent No.: US 11,166,082 B2
(45) Date of Patent: Nov. 2, 2021

(54) ALLOCATING STREAMING CONTENT ON A HYBRID NETWORK (71) Applicant: INTERNATIONAL BUSINESS MACHINES CORPORATION, Armonk, NY (US)

(72) Inventors: Craig Anthony Farrell, San Diego, CA (US); Peter Guglielmino, Northport, NY (US); Michael Edward Alexander, Great Falls, VA (US); Stephen A. Laufer, Saint Louis, MO (US); Michael William Clanton, Parker, CO (US); Fabien Lanne, Valbonne (FR); Zygmunt Lozinski, Cambridge (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/669,008

(22) Filed: Oct. 30, 2019

(65) Prior Publication Data
US 2021/0136460 A1    May 6, 2021

(51) Int. Cl.
H04N 21/61 (2011.01)
H04H 60/91 (2008.01)
H04H 60/85 (2008.01)
H04H 20/81 (2008.01)

(52) U.S. Cl.
CPC ........ H04N 21/6131 (2013.01); H04H 20/81 (2013.01); H04H 60/85 (2013.01); H04H 60/91 (2013.01); H04N 21/6137 (2013.01)

(58) Field of Classification Search
None
See application file for complete search history.

(56) References Cited

U.S. PATENT DOCUMENTS

| 6,618,585 | B1* | 9/2003 | Robinson ................. H04B 1/16 455/3.02 |
| 7,383,046 | B2 | 6/2008 | Jagadeesan et al. |
| 7,817,600 | B2 | 10/2010 | Lee et al. |

(Continued)

FOREIGN PATENT DOCUMENTS

CN    2009083938 A2    7/2009

OTHER PUBLICATIONS

Mann, C., "SK Telelcom 5G-ATSC 3.0 Mobile Demo Success," [online] Advanced Television Ltd © 2001-2019, Jun. 4, 2019, retrieved from the Internet: <https://advanced-television.com/2019/06/04/sk-telecom-5g-atsc-3-0-mobile-demo-success/>, 2 pg.

Primary Examiner — Jefferey F Harold
Assistant Examiner — Charles N Hicks
(74) Attorney, Agent, or Firm — Cuenot, Forsythe & Kim, LLC (57) ABSTRACT Allocating streaming content on a hybrid network can include searching for streaming content broadcast via broadcast signals over a broadcast network as a communications device is receiving the streaming content via a cellular network. Responsive to identifying, based on the searching, a within-range broadcast source broadcasting the streaming content via broadcast signals, the communications device can begin receiving the streaming content via the broadcast signals over the broadcast network and cease receiving the streaming content via the cellular network.

21 Claims, 8 Drawing Sheets (56) References Cited

U.S. PATENT DOCUMENTS

| | | |
|---|---|---|
| 7,937,086 B2 | 5/2011 | Chen et al. |
| 8,041,505 B2 | 10/2011 | Pierce et al. |
| 8,867,490 B1 | 10/2014 | Krishna et al. |
| 9,301,228 B2 | 3/2016 | Hwang et al. |
| 2008/0200154 A1* | 8/2008 | Maharajh ................ G06F 21/10 455/414.3 |
| 2009/0131101 A1* | 5/2009 | Van Rooyen ...... H04N 21/6131 455/552.1 |
| 2013/0159467 A1* | 6/2013 | Lundholm ......... H04N 21/8352 709/219 |
| 2016/0057504 A1* | 2/2016 | Shelby ................. H04W 72/00 725/62 |
| 2018/0063559 A1* | 3/2018 | Kim .................... H04N 21/472 |

\* cited by examiner

ALLOCATING STREAMING CONTENT ON A HYBRID NETWORK

BACKGROUND

This disclosure relates to wireless communications, and more particularly, to streaming video content over wireless communications networks.

The convergence of information technology (IT) and telecommunications networking has brought a wide range of services to businesses and individual users. Cellular networks provide the preferred platform for many of the services. As existing services expand and new ones are introduced, broadband data traffic—the growth of which is well-documented—is expected by many to grow even more dramatically in the future. Video is a dominant type of data traffic in cellular networks, and streaming video, particularly, is a significant and growing component of that data traffic.

SUMMARY

In one or more embodiments, a method can include searching, by a communications device that communicates via a cellular network, for streaming content that is broadcast via broadcast signals over a broadcast network as the communication device is receiving the streaming content over the cellular network. The method also can include causing the communications device to receive the streaming content via the broadcast signals over the broadcast network and cease receiving the streaming content via the cellular network in response to identifying, based on the searching, a within-range broadcast source broadcasting the streaming content via broadcast signals.

In one or more embodiments, a system includes a processor configured to initiate operations. The operations can include searching for streaming content that is broadcast via broadcast signals over a broadcast network as a communications device is receiving the streaming content over the cellular network. The operations also can include causing the communications device to receive the streaming content via the broadcast signals over the broadcast network and cease receiving the streaming content via the cellular network in response to identifying, based on the searching, a within-range broadcast source broadcasting the streaming content via broadcast signals.

In one or more embodiments, a computer program product includes a computer readable storage medium having program instructions stored thereon. The program instructions are executable by a processor to initiate operations. The operations can include searching for streaming content that is broadcast via broadcast signals over a broadcast network as a communications device is receiving the streaming content over the cellular network. The operations also can include causing the communications device to receive the streaming content via the broadcast signals over the broadcast network and cease receiving the streaming content via the cellular network in response to identifying, based on the searching, a within-range broadcast source broadcasting the streaming content via broadcast signals.

In one or more embodiments, a method can include detecting a communications device of a cellular service provider (CSP) subscriber receiving streaming content via broadcast signals over a broadcast network. The method also can include identifying the streaming content. Additionally, the method can include generating personalized content corresponding to the streaming content. The method also can include delivering the personalized content to the communications device over a cellular network, wherein the delivering is timed to coincide with delivery of a part of the streaming content based on a determination that the delivering is likely to enhance a viewing experience of the CSP subscriber.

In one or more embodiments, a system includes a processor configured to initiate operations. The operations can include detecting a communications device of a cellular service provider (CSP) subscriber receiving streaming content via broadcast signals over a broadcast network. The operations also can include identifying the streaming content. Additionally, the operations can include generating personalized content corresponding to the streaming content. The operations also can include delivering the personalized content to the communications device over a cellular network, wherein the delivering is timed to coincide with delivery of a part of the streaming content based on a determination that the delivering is likely to enhance a viewing experience of the CSP subscriber.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to wireless communications, and more particularly, to streaming content over wireless communications networks.

One aspect of the embodiments described herein is enabling a communications device receiving streaming content via a cellular network to hand-off the streaming content to a broadcast network if the streaming content is conveyed concurrently via broadcast signals. All decisions are made by the communications device, and all operations for the hand-off are performed or at least initiated by the communications device.

Another aspect is the delivery of personalized unicast content via the cellular network concurrently with delivery of the streaming content via the broadcast network. The personalized unicast content can be tailored to specific characteristics of a cellular network subscriber identified with the communications device.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
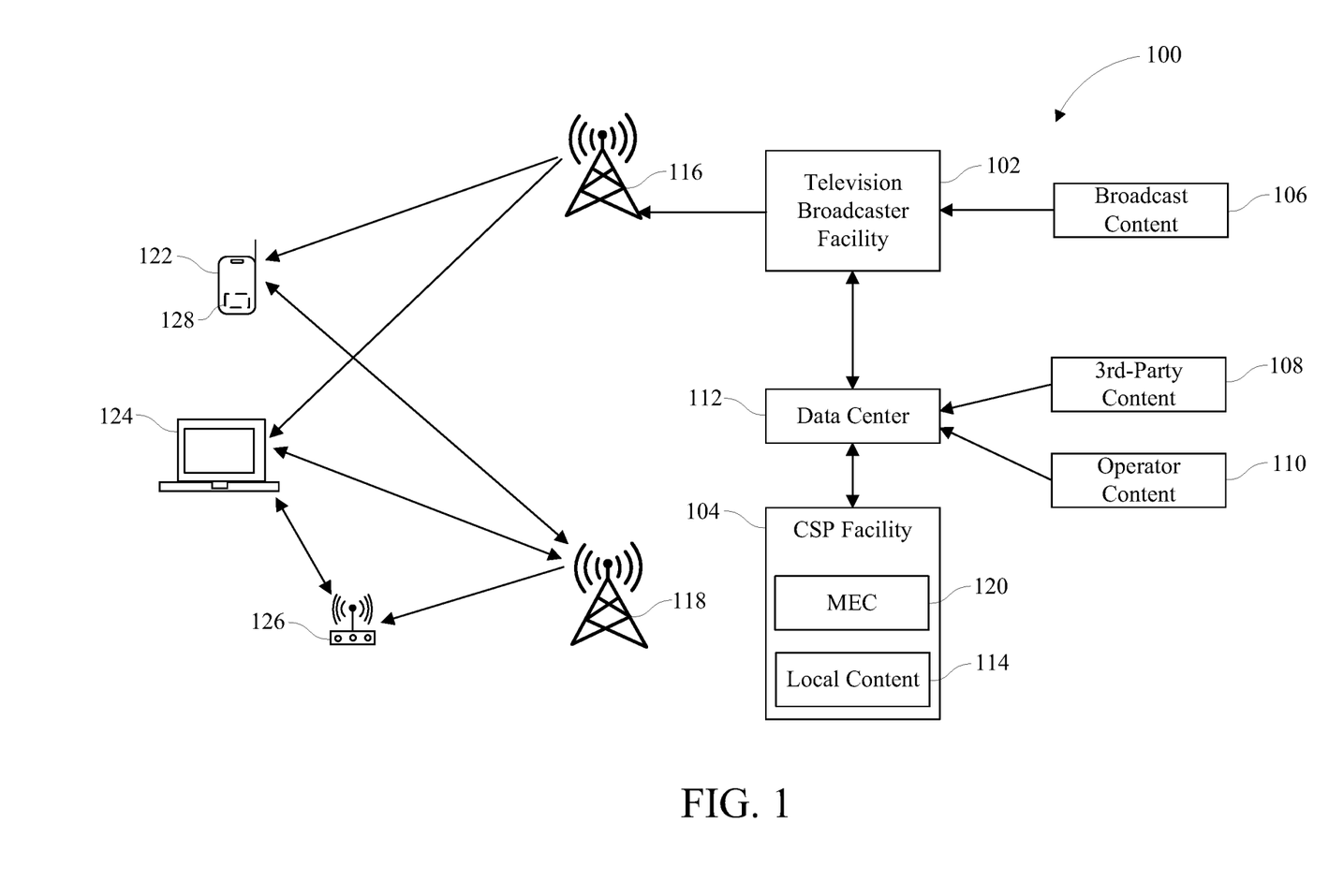
FIG. 1 illustrates a communications environment within which a system for allocating streaming content may operate according to an embodiment.

FIG. 1 depicts communications environment 100, which is an example of a communications environment in which certain embodiments of the systems disclosed herein may be implemented. Communications environment 100 represents a hybrid network that comprises both a cellular network and a broadcast network. Illustratively, communications environment 100 includes television (TV) broadcaster facility 102 and cellular services provider (CSP) facility 104, which can be jointly owned by a single entity or separately owned by different entities. TV broadcaster facility 102 can be part of a broadcast network, over which broadcast content 106 can be broadcast. CSP facility 104 can be part of a cellular, or mobile, network comprising multiple CSP facilities, or base stations, of which CSP facility 104 is one. The cellular network, in addition to facilitating mobile communications, can also be a conduit for conveying third-party content 108 and operator content 110. Third-party content 108 (e.g., YouTube®, Twitch®, Netflix®), as well as operator content 110, can be electronically stored in local data center 112 and conveyed by an electronic communications link to CSP facility 104 for wireless conveyance over the cellular network. CSP facility 104 can electronically store and wirelessly convey local content 114, described more fully below, as well.

TV broadcaster facility 102 can include one or more broadcast antennas (only one of which is shown, namely broadcast antenna 116) along with a transmitter and other equipment (not explicitly shown) for transmitting streaming content via radio frequency signals (the specific class of which are referred to herein as TV broadcast signals) over specific channels.

The TV broadcast signals can be digital television signals. For example, the broadcast signals can be American Television System Committee (ATSC) digital signals that are broadcast in conformance with ATSC standards. One aspect of ATSC 3.0 is the employment of a very robust "bootstrap" signal that is detectable even at low signal levels. One goal of ATSC 3.0 is that new signal types, even ones yet to be introduced, can be provided by a broadcaster and identified within a transmitted waveform through use of the bootstrap signal. The systems disclosed herein are operative with respect to various TV broadcast standards, as well as ATSC standards, and include Digital Video Broadcasting-Terrestrial (DVB-T), Digital Terrestrial Multimedia Broadcast (DTMB), and ISDB-T International, for example.

Although only one television broadcaster facility is shown, it will be readily apparent that communication environment 100 can include multiple television broadcaster facilities, each one broadcasting different streaming content over distinct channels concurrently with each of the others.

CSP facility 104, as part of a broader cellular network, includes cell tower 118 and additional equipment (not explicitly shown) such as a transceiver and controller, the controller communicatively coupled to a remote switching center, for example. Additionally, CSP facility 104 can include one or more servers or other computer systems configured to implement mobile edge computing (MEC) 120. Mobile edge computing, generally, enables IT-based servers to operate at a network's edge and incorporate aspects of cloud computing. In various embodiments, a multiple edge computing application server can be deployed at a macro base station EnodeB as part of an LTE cellular network or at a Radio Network Controller that is part of a 3G cellular network. In the present context, MEC 120 can process locally stored data, such as local content 114 cached on an MEC server or received from local data center 112 communicatively coupled to the MEC server. As described in greater deal below, MEC 120 can be used by the systems described herein to leverage two salient characteristics of MEC technology: proximity and location awareness. Proximity refers to an MEC server's closeness to specific sources of information, and location awareness refers to the MEC server's direct access to user equipment (UE) communicatively coupled to the network.

Communications environment 100 illustratively includes mobile device 122, which communicates over the cellular network through cell tower 118, and fixed device 124, which can communicate over the cellular network directly via cell tower 118 or through Wi-Fi network 126. As defined herein, a "mobile device" is any device that can be carried by a user without assistance and is capable of receiving and processing streaming content. A "fixed device," as defined herein, is any device that in ordinary use remains stationary and is capable of receiving and processing streaming content. A "communications device," as defined herein includes both mobile devices and fixed devices.

Mobile device 122 can be, for example, a smartphone, laptop, tablet, vehicle-installed communication system, or other similar such mobile device or system. Fixed device 124 can be, for example, a personal computer (PC), television receiver, home entertainment system, or similar such stationary device or system. A TV broadcast signal receiving component (not shown) can be integrated within or detachably coupled to mobile device 122. For example, external components such as a portable TV receiver and antenna can communicatively couple to a mobile device such as a smartphone to enable the smartphone to receive streaming content via broadcast signals over a broadcast network. Alternatively, a TV tuner (e.g., a single chip) can be integrated in the smartphone. A sufficiently sized antenna for capturing over-the-air (OTA) TV broadcast signals can be coupled to the smartphone as needed.

Mobile device 122 illustratively includes system 128, which is a system for allocating video content between a TV broadcast network and a cellular network. In one embodiment, described more fully below with reference to FIGS. 2A and 2B, system 128 can implemented in processor-executable instructions that run on a processor of mobile device 122. For example, system 128 can be an application comprising one or more modules, each module containing one or more routines, functions, or instructions for causing mobile device 122 to perform the operations described below. Accordingly, in one embodiment, system 128 can be downloaded and stored in a memory of mobile device 122 and executed by the mobile device's processor.

System 128 operates in response to mobile device 122 receiving streaming content via the cellular network. Alternatively, system 128 can respond to mobile device conveying a request over the cellular network requesting the streaming content. In either event, system 128 causes mobile device 122 (endowed with a capability to receive broadcast signals) to search, or "listen," for broadcast signals. System 128 causes mobile device 122 to receive the streaming content via the broadcast signals over the broadcast network in response to identifying, based on the searching, a within-range broadcast source broadcasting the streaming content via broadcast signals. If mobile device 122 is receiving the steaming content over the cellular network, system 128 causes the mobile device to terminate the cellular network-hosted session. The hand-off of the streaming content from the cellular network to the broadcast network can be accomplished entirely by mobile device 122 operating in accordance with the instructions of system 128.

In some embodiments, system 128 responds to the detecting of a broadcast signal by determining the channel over which the broadcast signals are being broadcasted. System 128 can query a CSP-maintained or other database over the cellular network to identify the streaming content being broadcast over the channel. The CSP-maintained or other database can indicate which broadcasters are broadcasting what content over specific channels at certain times. Based on the information, system 128 determines whether the detected broadcast signal is broadcasting the specific streaming content sought by the user of mobile device 122. System 128 can determine whether the broadcasted streaming content is indeed the streaming content sought and, if so, can cause mobile device 122 to terminate the cellular network-hosted session if the mobile device is receiving the streaming content via the cellular network. (If mobile device 122 has merely conveyed a cellular network request for the streaming content, system 128 can instead circumvent the request upon determining the streaming content can be obtained via broadcast signals.)

System 128 can retrieve streaming content indicia from one or more databases the system uses to determine whether streaming content broadcast over the broadcast network is the same streaming content received via the cellular network. For example, the CSP-maintained database can function as an on-line "TV guide" that lists indicia such as broadcast channels, content, and specific times that a broadcaster streams the content on a specific channel. Mobile device 122, associated or identified with a user who is a CSP subscriber, can access the information over the cellular network. Using the information, system 128 can identify, based on broadcast signals received with the communications device, the channel over which the identified broadcast signals are being broadcast. Specifically, system 128 can consult the on-line TV guide for indicia identifying the content that is broadcasting over that channel at the specific time. Having determined the identity of the broadcasted streaming content based on the indicia, system 128 can compare the indicia corresponding to the broadcasted streaming content to indicia indicating the identity of the streaming content mobile device 122 is receiving over the cellular network. The identity of the streaming content mobile device 122 is receiving over the cellular network can be determined, for example, based on a request conveyed over the cellular network requesting access to streaming content via the cellular network. If the determined identity of the streaming content broadcast over the broadcast network matches the determined identity of the streaming content requested via the cellular network, system 128 invokes a hand-off of the streaming content. The hand-off results in mobile device 122 receiving the streaming content over the broadcast network and ceasing to receive the streaming content via the cellular network.

The operations of a system for allocating streaming content have thus far been described in the context of a mobile device (e.g., smartphone), described in greater detail below. However, it is noted that the system for allocating streaming content can also be implemented in a fixed device (e.g., PC, home entertainment system, and the like) that includes or can be attached to a wireless interface. Operating in a fixed device, the system can perform the operations described in the context of a mobile device.

Figure 2A:
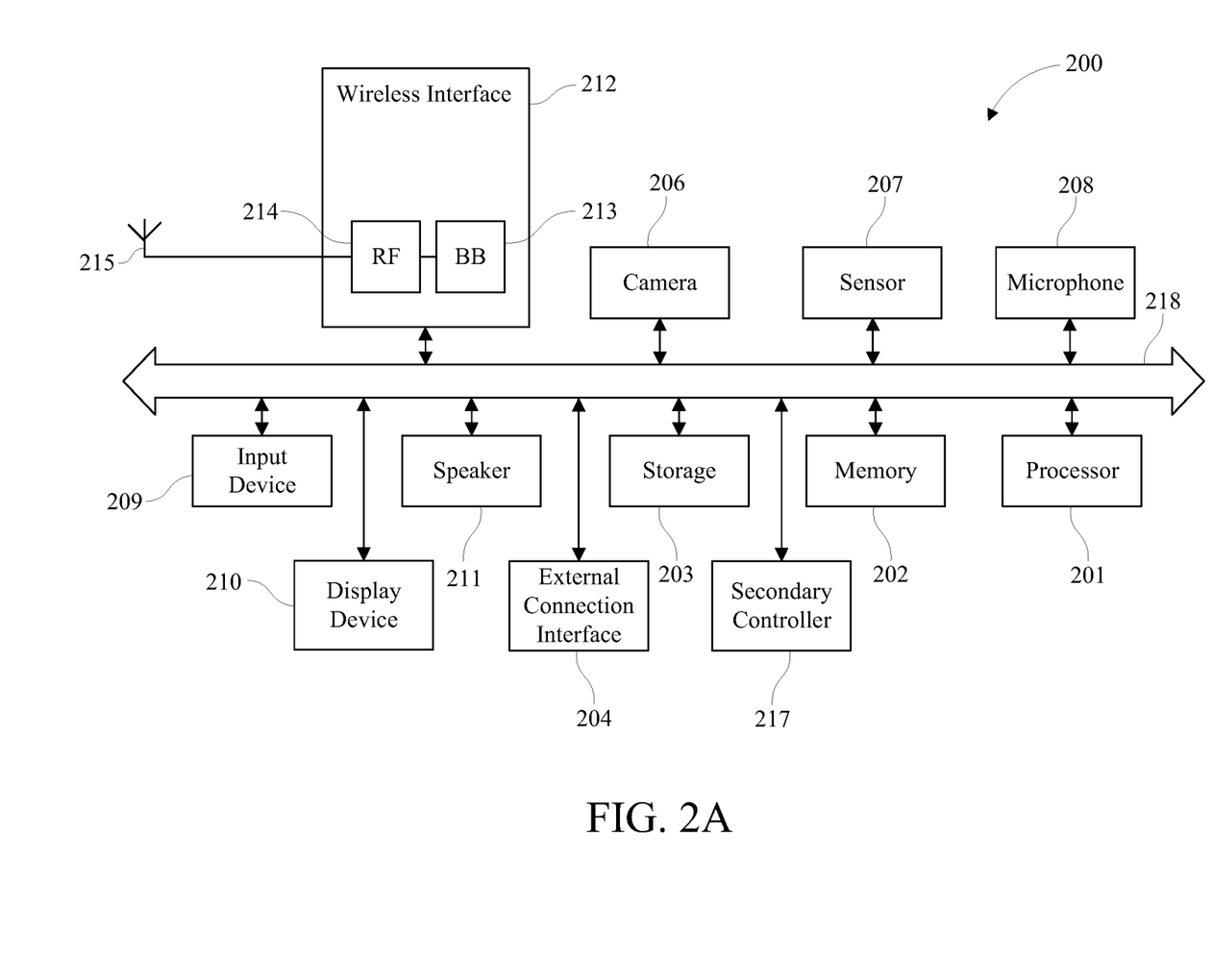
FIGS. 2A and 2B illustrate a system for allocating streaming content and a device in which the system can be implemented according to an embodiment.

FIG. 2A is a block diagram of a smartphone 200, which is illustrates a type of mobile device in which system 220 (depicted in FIG. 2B), a system for allocating streaming content, can be implemented according to an embodiment. Smartphone 200 illustratively includes processor 201, memory 202, storage 203, external connection interface 204, camera 206, sensor 207, microphone 208, input device 209, display device 210, speaker 211, wireless communication interface 212 (operatively coupled to antenna 215), and secondary controller 217, all of which are operatively coupled via bus 218.

Processor 201 can be, for example, a central processing unit (CPU) or a system-on-chip (SoC) that controls the functions of an application layer (not explicitly shown) and other layers of smartphone 200. Memory 202 can include a random-access memory (RAM) and read-only memory (ROM) for storing data as well as one or more programs (e.g., modules comprising functions, routines, and operations) executable by processor 201. Storage 203 can comprise a storage medium such as semiconductor memories and hard disks. External connection interface 204 can provide a connection (e.g., a universal serial bus (USB) port) for detachably coupling smartphone 200 to an external device (e.g., memory card, USB device). Camera 206, which can include an image sensor (e.g., charge-coupled devices), can capture images, and sensor 207 can comprise one or more sensors, such as gyro sensor and accelerometer. Microphone 208 can generate audio signals in response to sound received into smartphone 200. Input device 209 can include, for example, a touch sensor to detect a user's touching display 210, which can comprise a liquid crystal display (LCD) or organic light emitting diode (OLED) for displaying images. Input device 209, alternatively, can comprise a keypad with which a user can input data.

Wireless communication interface 212 illustratively includes baseband (BB) processor 213 and radio frequency (RF) circuit 214. BB processor 213 can be configured to perform signal encoding/decoding, modulation/demodulation, and multiplexing/demultiplexing, as well as different types of signal processing. RF circuit 214 can include a mixer, a filter, and an amplifier (none of which are explicitly shown) for transmitting and receiving wireless signals via antenna 215.

Secondary controller 217 can maintain a minimal functionality of smartphone 200 when the device is in sleep mode. A battery (not shown) can supply electric power to each of the components of smartphone 200 when the device is in operational mode.

Figure 2B:
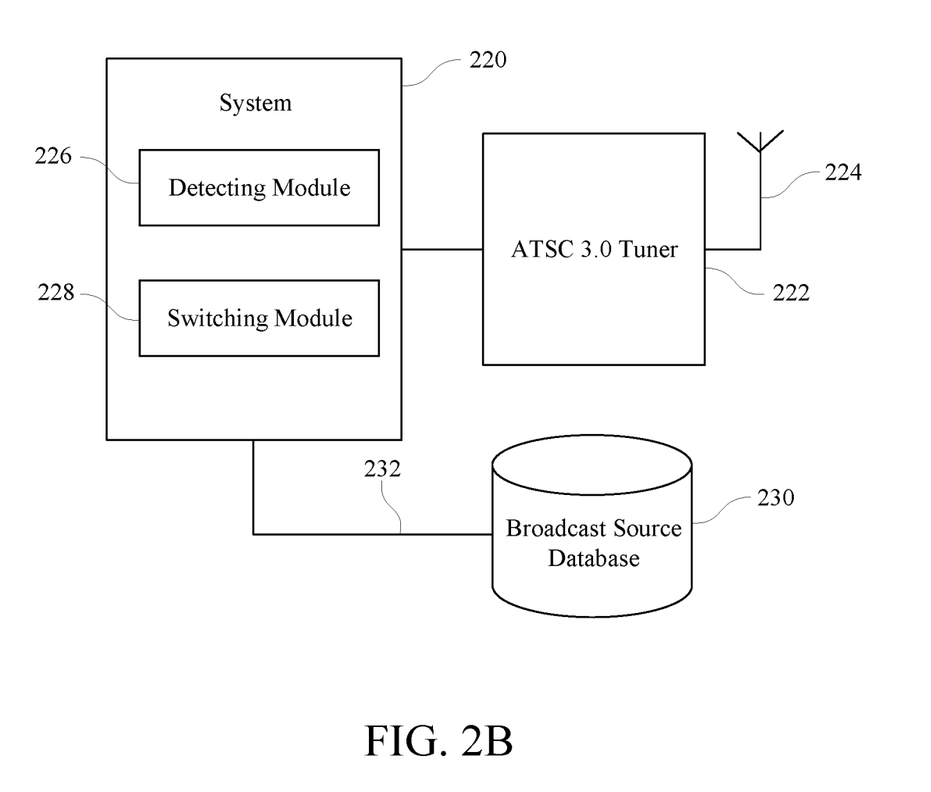

Referring additionally now to FIG. 2B, system 220 in accordance with one embodiment is capable of performing a set of operations for allocating streaming video. The set of operations can be implemented in processor-executable instructions stored in memory 202 and executed by processor 201 of smartphone 200 when conveyed to the processor via bus 218.

System 220 communicatively couples to ATSC 3.0 tuner 222, which is one example of a TV tuner that enables smartphone 200 to process streaming video content received via broadcast signals over a broadcast network. The ATSC 3.0 tuner 222 can be used with a reduced-size antenna relative to ones typically required for broadcast signals. ATSC 3.0 tuner 222 can be integrated with other circuitry within a housing of smartphone 200 and communicatively coupled to other circuitry within the housing via bus 218. ATSC 3.0 tuner can similarly be deployed to provide the same or similar functionality in other communication devices, both mobile and stationary, including smartphones, laptops tablets, PCs, home-entertainment systems, and vehicle-installed systems.

In other embodiments, system 220 can be communicatively coupled to different circuitry using other types of TV tuners for processing streaming content via broadcast signals over a broadcast network. The circuitry, for example, can be housed in a standalone device that operatively couples to system 220 as well as other circuitry of smartphone 200 via external connection interface 204. Optionally, the circuitry, whether integrated in or externally coupled to other circuitry of smartphone 200, can be used in conjunction with an additional broadcast signal receiving antenna 224.

System 220 illustratively comprises detecting module 226 and switching module 228. Module 226 can search for streaming content that is broadcast via broadcast signals over a broadcast network. The search can be initiated in response to smartphone 200 receiving the streaming content via a cellular network or in response to a request to access the streaming content via the cellular network. The search can detect the presence of a broadcast network with a current channel available over which the streaming content can be received via broadcast signals.

Detecting module 226, in certain embodiments, can link to broadcast source database 230 via communication link 232 (e.g. the Internet accessed through the cellular network). Broadcast source database 230 can electronically store data, the data indicating which streaming video will be broadcast by which broadcast sources, at what times, and in which geographic regions. Broadcast source database 230 can be maintained, as described above, by a CSP. Based on the information obtained from broadcast source database 230, detecting module 226 can ascertain whether the accessible channel is broadcasting the desired streaming content and, if so, can convey the information to switching module 228.

Optionally, switching module 228, using the circuitry within smartphone 200, can ascertain the strength of the signals broadcast by the identified broadcast source. If the signal strength exceeds a predetermined threshold, switching module 228 can cause smartphone 200 to receive the streaming content via the broadcast signals over the broadcast network. Upon smartphone 200 beginning to receive the streaming content via the broadcast signals over the broadcast network, switching module 228 can cause smartphone 200 to terminate receiving the streaming content via the cellular network.

System 220 can notify the CSP that smartphone 200 has ceased receiving the streaming content via the cellular network. The handoff of the streaming content from the cellular network to the broadcast network free resources that had been, or otherwise would have been, used by the CSP to stream the now-offloaded streaming content. The CSP can instead use the same resources for delivering unique personalized content over the cellular network. The personalized content can be used to supplement the streaming content, which can be characterized as generalized content, to enrich a user's experience. "Generalized content," as the term is used herein, is streaming content that is conveyed in an identical form to all viewers receiving the streaming content. General content, for example, can be a sporting event, a movie, or the like that goes out to all viewers in the same form and without any enhancement in form or content. By contrast, "personalized content," as the term is user herein, is content that is tailored for a specific user or class of users. The personalized content, for example, can include premium content, advertisements, marketing-based offers, and other content uniquely tailored for the user or class of users, based on subscriber information the user or users provide to the CSP.

Personalized content can relate to and supplement, or otherwise enhance, the specific streaming content. For example, while a user is viewing streaming content of a sporting event, the CSP can overlay or scroll content giving player statistics, team background information, other game scores, and the like. Similarly, for example, while the user is watching a movie the CSP can display a banner with information about the movie's cast and/or a link to information about one or more of the movie's actors.

Personalized content, in certain embodiments, can be based on CSP subscriber statistics, acquired by the CSP as authorized by the user as a CSP subscriber or submitted by the user at the CSP's invitation. The statistics can be analyzed by the CSP to discover specific topics of interest to the user. For example, the information can indicate that the user is a "film buff." Thus, to enhance the user's experience watching a film, the CSP can render textual content describing the background of the making of the film or the origins of the film (e.g., novel on which the film is based). The textual content, for example, can provide information about the director, the scriptwriter, and/or one or more of the actors. The information can identify other films by the same actors or director. The information can recommend other notable films within the same genre. Similarly, for a subscriber watching a sporting event. CSP analysis of subscriber statistics may indicate that the user is a fan of one of the teams, allowing the CSP to overlay or scroll background information on the team's players and/or coaches, as well as other team-related information.

In all instances, the delivery of content, both as to form and timing, can be such that the user's viewing is not interrupted. The specific form and timing of delivery, moreover, can be based, for example, on statistical analyses of viewer characteristic, marketing studies, and the like to determine the forms and timing of delivery of content that are most likely enhance the user's viewing experience and/or capture the user's attention.

In certain embodiments, system 220 can be supported by MEC running on a CSP server. As noted above, MEC offers distinct advantages by operating at the edge of a cellular network. The advantages can be leveraged with respect to generation and delivery of the personalized content. The proximity and location awareness of the MEC supports generating the personalized content based on data corresponding to the CSP subscriber, for example. Moreover, the personalized content can comprise content cached by the MEC server. The content can include, for example, premium content, commercial offers, and targeted advertisements that are cached in the MEC server and that are tailored specifically for the CSP subscriber.

Figure 3A:
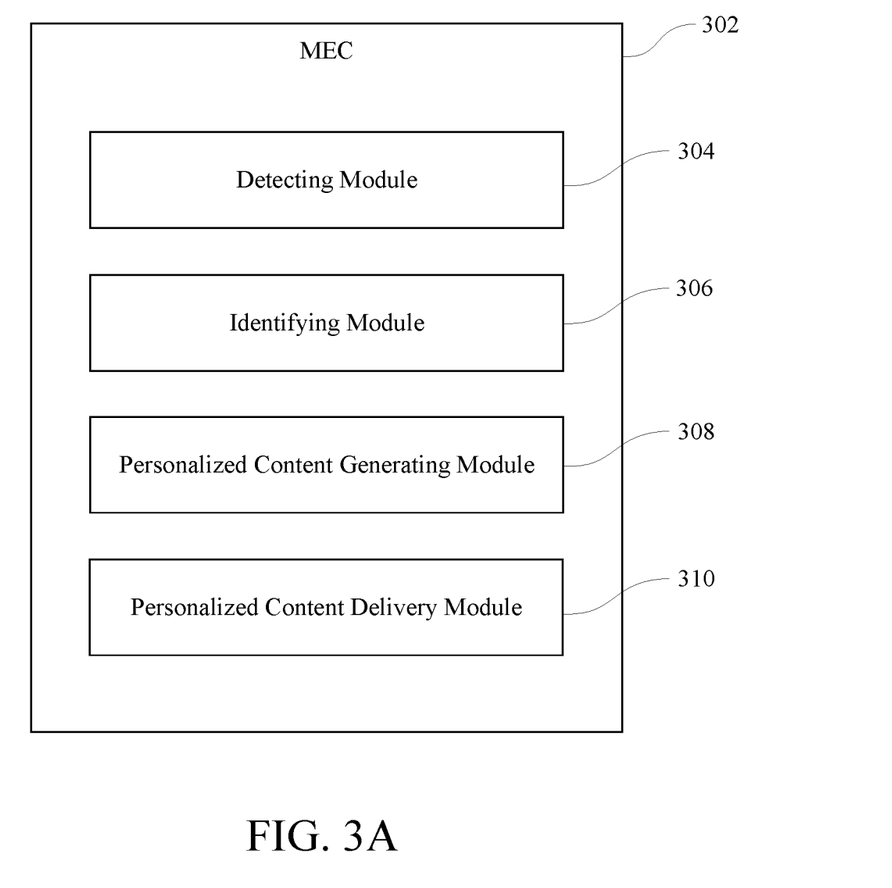
FIGS. 3A and 3B illustrate a system for providing personalized content and a computing node in which the system can be implemented according to an embodiment.
Figure 3B:
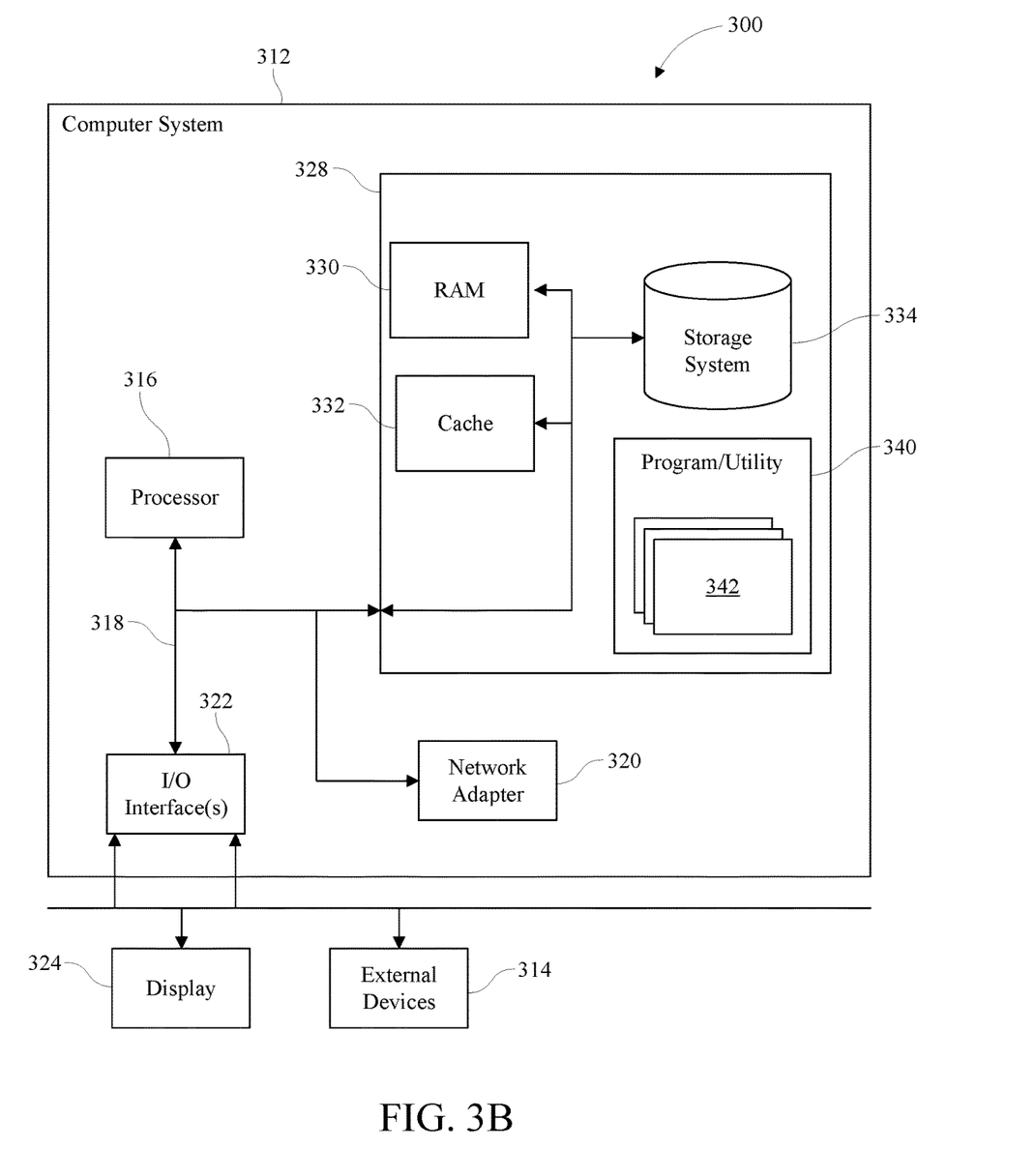

FIGS. 3A and 3B depict computing node 300 and MEC 302, which, in accordance with one embodiment, illustrate the hardware and MEC software running on the hardware for carrying out the MEC operations described.

Referring initially to FIG. 3A, MEC 302 illustratively comprises detecting module 304, identifying module 306, personalized content generating module 308, and personalized content delivery module 310. Operatively, detecting module 304 detects a communication device of a CSP subscriber receiving streaming content via broadcast signals over a broadcast network. Identifying module 306 identifies the streaming content. Based on the identifying, personalized content generating module 308 generates personalized content corresponding to the streaming content. Personalized content delivery module 310 delivers the personalized content to the communication device over a cellular network. Specifically, delivery of the personalized content can be timed to coincide with delivery of a part of the streaming content based on a determination that the delivery, so timed, is likely to enhance a viewing experience of the CSP subscriber or is most likely to capture the attention of the CSP subscriber.

Referring now to FIG. 3B, a block diagram of computing node 300 illustrates a computing node for implementing MEC that, operating at the edge of a cellular network, can be used in conjunction with a system to allocate streaming video. Computing node 300 illustratively includes computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 can be described in the general context of computer system-executable instructions, such as program modules, being executed by a computer system. Generally, program modules may include routines, objects, components, logic, data structures, and so on that perform particular tasks or implement particular abstract data types. Computer system 312 may be practiced in distributed computing environments (e.g., a cloud environment) where tasks are performed by remote processing devices that are linked through a communications network. In a distributed computing environment, program modules may be located in both local and remote computer system storage media including memory storage devices.

As shown in FIG. 3, computer system 312 is illustratively in the form of a general-purpose computing device. The components of computer system 312 can include one or more processors 316, memory 328, and bus 318, which operatively couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media can be any type media that is accessible by computer system 312, and can include both volatile and non-volatile media, removable and non-removable media.

Memory 328 can include computer system readable media in the form of volatile memory, such as random-access memory (RAM) 330 and/or cache memory 332. Computer system 312 can further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 can include at least one program product having a set (e.g., at least one) of program modules that are configured to carry out the functions of embodiments described herein.

Program/utility 340, having a set (at least one) of program modules 342, can be stored in memory 328 as can an operating system, one or more application programs, other program modules, and program data. Program modules 342 generally carry out the functions and/or methodologies of embodiments described herein. For example, one or more of the program modules implement MEC 302 shown in FIG. 3A.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Computer system 312 can communicate with one or more networks such as a local area network (LAN), a general wide area network (WAN), and/or a public network (e.g., the Internet) via network adapter 320.

As depicted, network adapter 320 communicates with the other components of computer system 312 via bus 318. It will be readily understood that although not shown, other hardware and/or software components could be used in conjunction with computer system 312. Examples include microcode, device drivers, redundant processing units, external disk drive arrays, RAID systems, tape drives, and data archival storage systems, etc.

Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is an example of a server (e.g., MEC server). As defined herein, the term "server" means a data processing system configured to share services with one or more other data processing systems. Examples of a client device include, but are not limited to, a workstation, a desktop computer, a computer terminal, a mobile computer, a laptop computer, a netbook computer, a tablet computer, a smartphone, a set-top box, a smart television and the like. In one or more embodiments, the various devices described herein may be client devices. Network infrastructure, such as routers, firewalls, switches, access points and the like, are not client devices as the term "client device" is defined herein.

Figure 4:
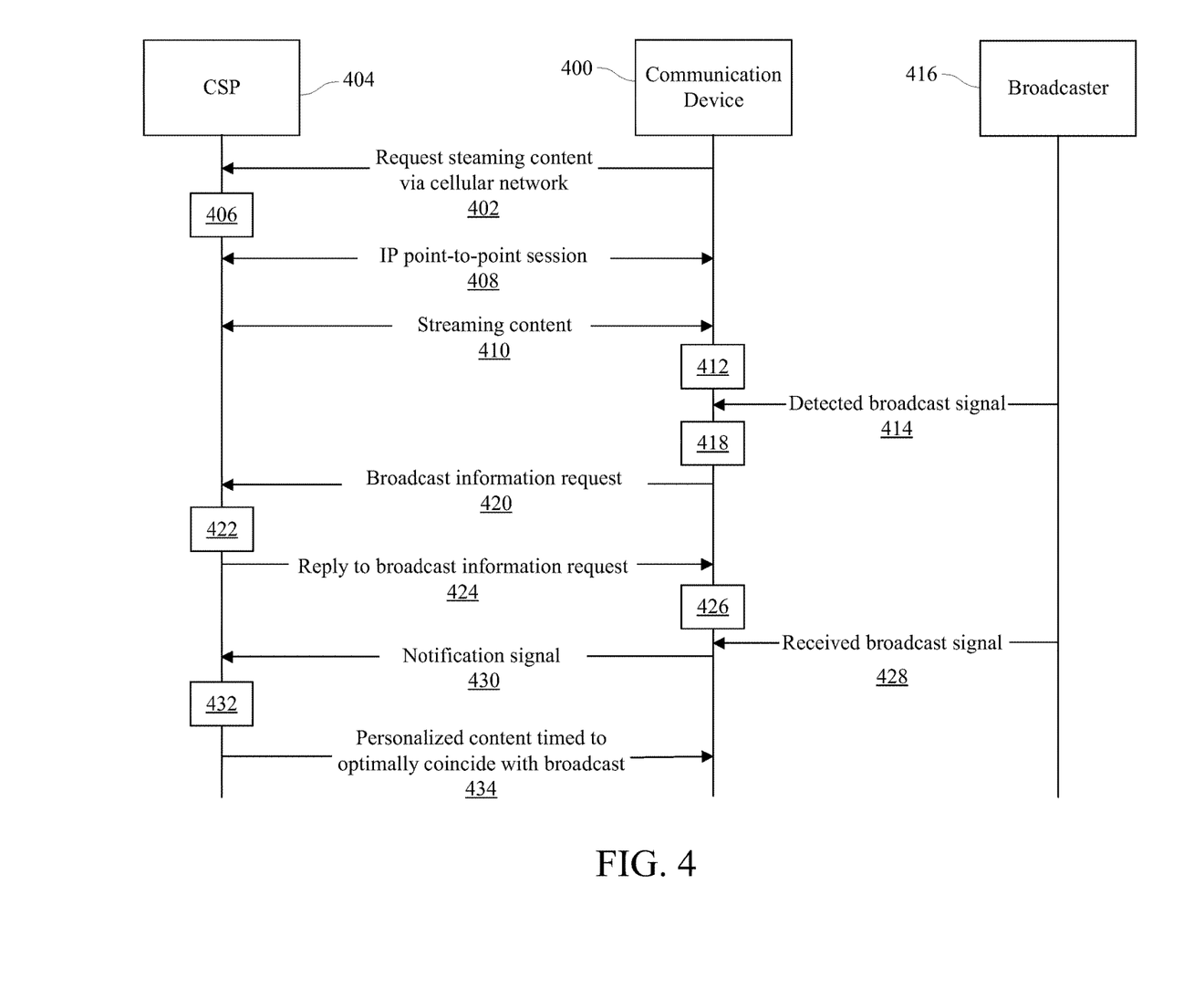
FIG. 4 is a signal flow diagram illustrating certain operative aspects of a system for allocating streaming content according to an embodiment.

FIG. 4 is a signal flow diagram that illustrates certain operative features of a system such as system 220 that, running in communication device 400, allocates streaming content in a hybrid network comprising a cellular network and a broadcast network. Initially, a CSP subscriber conveys request 402 over the cellular network to CSP 404, the request directed to an IP-based content provider. Request 402 requests certain streaming content. Request 402 is processed by the IP-based content provider at block 406 and an IP point-to-point session is established with link 408. The streaming content is streamed to communication device 400 over the cellular network at block 410. At block 412, the system for allocating streaming content causes device 400 to search or "listen" for a broadcast signal. Optionally, if a broadcast signal is detected, the system can use the circuitry of device 400 to determine whether the broadcast signal's strength exceeds a predetermined threshold.

Illustratively, communication device 400 detects broadcast signals 414 transmitted by broadcaster 416. In response, the system generates an information request at block 418 requesting broadcast information from CSP 404. The broadcast information can indicate which broadcasters within range of communication device 400 are broadcasting which streaming content and at which times over which channels. Broadcast information request 420 is conveyed to CSP 404 over the cellular network. CSP 404 searches a broadcast information database at block 422 and conveys reply 424, which provides the requested broadcast information.

Based on the information, the system can determine at block 426 whether the streaming content conveyed via broadcast signals over the broadcast network is the same streaming content received via the cellular network. The system can make the determination based on the specific channel over which the broadcast signals are transmitted and consulting the information received from CSP 404. If the identical streaming content is available over the broadcast network, the system invokes a hand-off, terminating the IP point-to-point session and causing communication device 400 to process the received broadcast signals 428.

CSP 404 can recognize the termination of the IP point-to-point session. Optionally, the system can convey notification 430 to CSP 404 notifying CSP 404 of the hand-off so that CSP 404, though recognizing termination of the IP point-to-point session, nonetheless knows that the user is receiving the streaming content over the broadcast network. CSP 404, having been informed that the user is still viewing the streaming content, albeit on the broadcast network rather than via the cellular network, can generate personalized content at block 432. The personalized content 434 can be conveyed to the user's device via cellular network as the user is receiving generalized streaming content at the device over the broadcast network. As described above, delivery of the personalized content can be timed to coincide with delivery of a part of the streaming content based on a determination in a manner most likely to enhance a viewing experience of the CSP subscriber and/or is most likely to capture the attention of the CSP subscriber. The system, through communication device 400, can inform CSP 404 while the user is viewing the streaming content over the broadcast network and/or notify CSP 400 when the user stops viewing the streaming content. The notification can be used by CSP 400 to synchronize delivery of personalized content and to cease delivery when the user stops viewing the streaming content. Other than the initial user request to receive steaming content, all the actions can be automatically carried out entirely by the system within the communication device and without user input.

Figure 5:
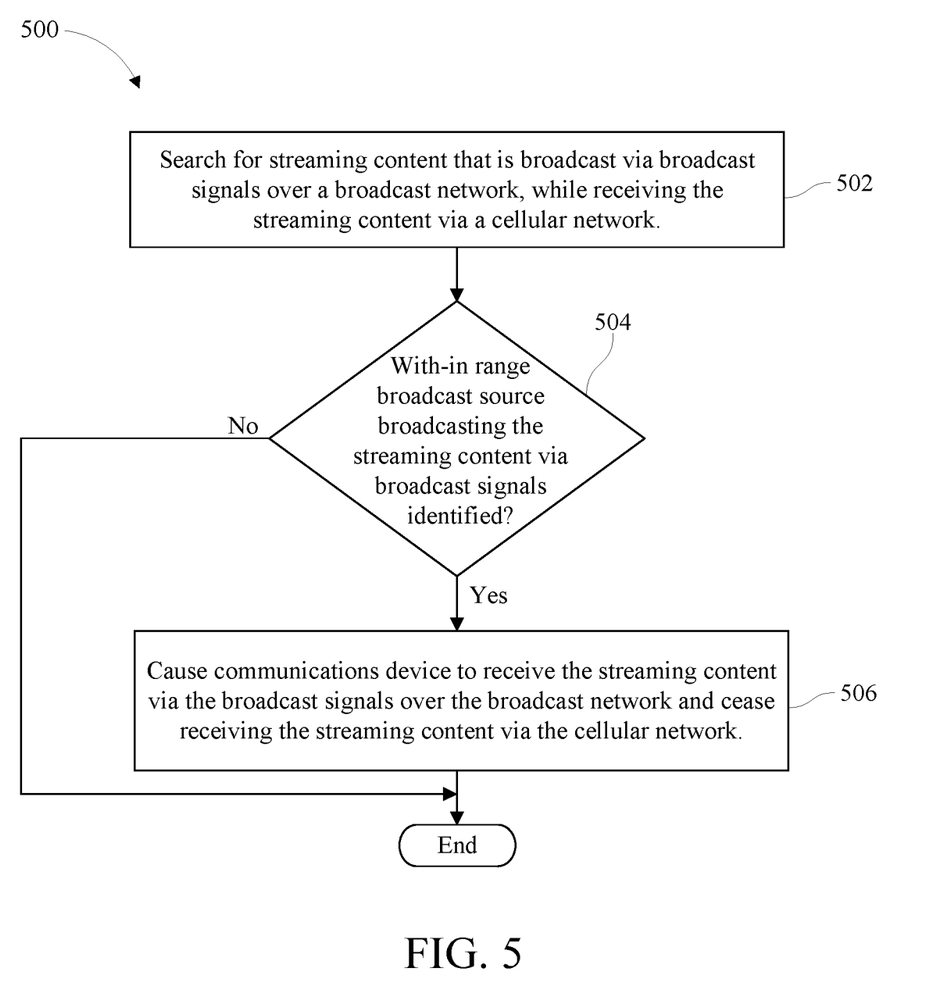
FIG. 5 is a flowchart of a method for allocating streaming content according to an embodiment.

FIG. 5 is a flowchart of method 500, a method for allocating steaming content according to an embodiment. Method 500 can be performed by a system the same or similar to the systems described with respect to FIGS. 1, 2A, and 2B that operates on a user communication device (e.g., smartphone). The system, at block 502, searches for streaming content that is broadcast via broadcast signals over a broadcast network as a communication device is receiving the streaming content over a cellular network. Responsive to identifying, based on the searching, a within-range broadcast source broadcasting the streaming content via broadcast signals at block 504, the system at block 506 causes the communications device to receive the streaming content via the broadcast signals over the broadcast network and to cease receiving the streaming content via the cellular network. The system can use the communication device to determine that a broadcast source is within range based on the strength of the signals that are broadcast by the identified broadcast source. Thus, in some embodiments, if the signal strength exceeds a predetermined threshold, then the system determines that the broadcast source is within range for the communication device to adequately receive streaming content via the broadcast signals over the broadcast network.

In certain embodiments, the streaming content can comprise general content and the system can additionally cause the communications device to receive personalized content via the cellular network such that a communications device user can concurrently experience general content received via the broadcast network and personalized content received via the cellular network.

The identifying at block 504 can comprise determining a channel over which the broadcast signals are being broadcasted. Based on a determination of the channel over which the broadcast signals are being broadcasted, the system can identify the streaming content. In certain embodiments, the identifying can comprise comparing indicia associated with the channel over which the broadcast signals are being broadcasted with indicia associated with the streaming content the communication device is receiving over the cellular network.

For example, in some embodiments, the system can retrieve the indicia from one or more databases. For example, a CSP to who's network a user of the communications device subscribes can maintain a database corresponding to an on-line TV guide that lists indicia such as broadcast channels, content, and the times that a broadcaster streams the content on a specific channel. The system can identify, based on broadcast signals received with the communications device, the channel over which the identified broadcast signals are being broadcast. The system can consult the on-line TV guide to identify the content that is listed for broadcasting over that channel at the specific time based on the indicia provided by the on-line TV guide. Having determined the identity of the broadcasted streaming content, the system can compare the identity of the broadcasted streaming content to the identity of the streaming content the communication device is receiving over the cellular network. The latter can be determined, for example, based on a request conveyed over the cellular network requesting access to streaming content via the cellular network. If the determined identity of the streaming content broadcast over the broadcast network matches the determined identity of the streaming content request via the cellular network, the system can effect a hand-off of the streaming content—causing the device to begin receiving the streaming content over the broadcast network and to cease receiving the streaming content via the cellular network. The system can effectively auto-tune the receiver to the appropriate channel for receiving the streaming content over the broadcast network. The receiving, as the term is used herein, encompasses performing by a user's device any and all necessary operations such as decoding and rendering the video and audio extracted from the broadcast signals through the device in lieu of the device rendering the streaming content that is conveyed over the cellular network.

In some embodiments, the system initiates the searching in response to detecting the communication device receiving the streaming content via a cellular network. However, in other embodiments, the searching is initiated as soon as a request conveyed from the communication device over the cellular network requesting access to the streaming content is detected. The communication device can begin receiving and continue receiving the content over the cellular network while the communication device, directed by the system, searches for the streaming content on a broadcast channel over a broadcast network.

Method 500 can be carried out with the system implemented in various communications devices configured to receive broadcast signals transmitted according to any of a plurality of digital television signal standards. The plurality of digital television signal standards includes, for example, ATSC, DVB-T, DTMB, and ISDB-T broadcast television standards.

Figure 6:
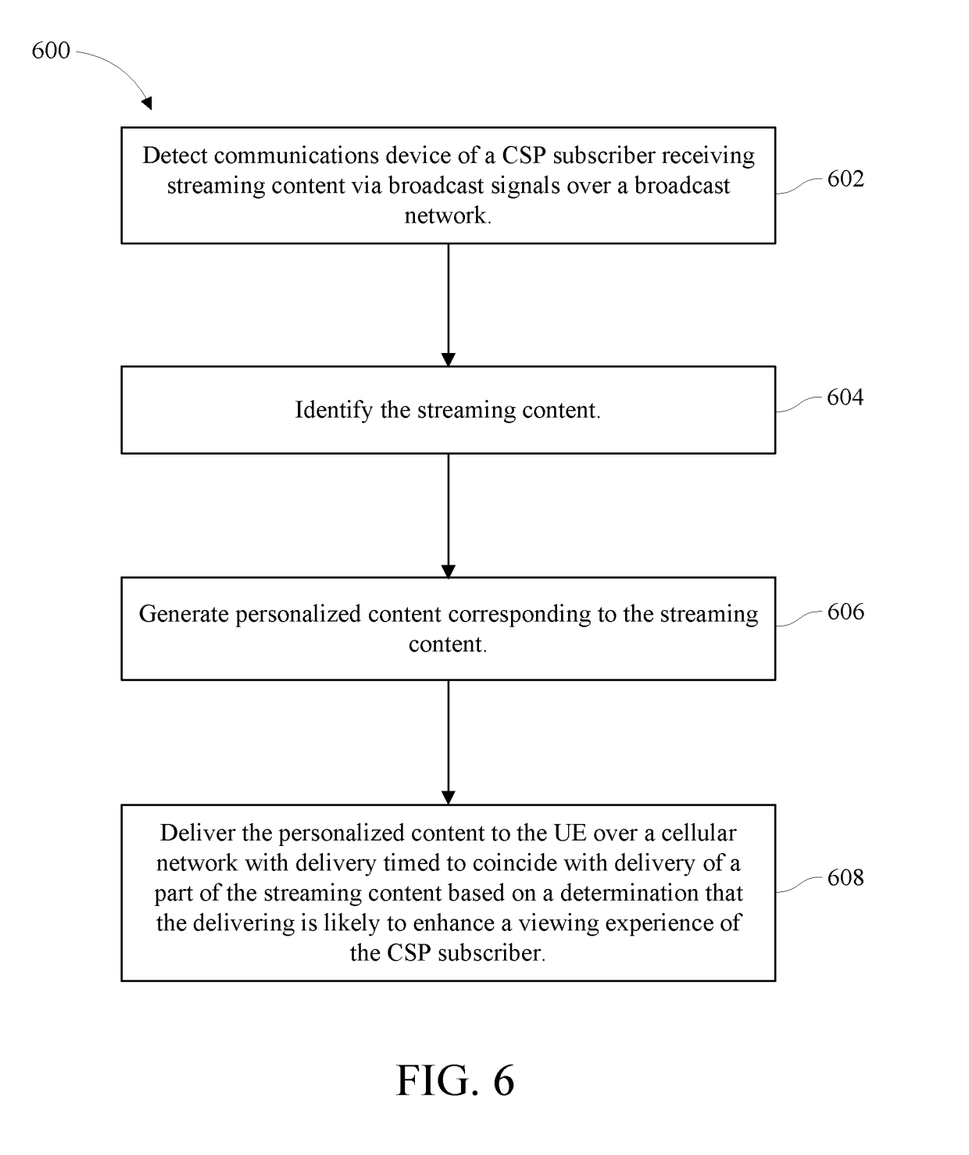
FIG. 6 is a flowchart of a method for generating and delivering personalized content in conjunction with allocating streaming video according to an embodiment.

FIG. 6 is a flowchart of method 600, a method for generating and delivering content using MEC. Method 600 can be carried out by a system the same or similar to the system described with reference to FIGS. 3A and 3B. The system can perform aspects of method 600 at any single point or at multiple points within the CSP network, such as creating or generating user-specific content at the network operations center and conveying the information to a CSP subscriber's device from a CSP base station. In certain embodiments, all operations including the creating or generating user-specific content are performed using MEC on an MEC server located at a CSP base station, thereby enabling creation or generation of the content at the edge of the cellular network.

The system at block 602 can detect the communications device of a CSP subscriber receiving streaming content via broadcast signals over a broadcast network. At block 604, the system can identify the streaming content. The system can generate at block 606 personalized content corresponding to the streaming content. The system can deliver the personalized content to the communications device over a cellular network at block 608.

The system's delivery of the personalized content can be timed to coincide with delivery of a part of the streaming content based on a determination that the delivering is likely to enhance a viewing experience of the CSP subscriber. The personalized content can be generated based on CSP subscriber data. The personalized content can comprise content cached by the MEC server.

The terminology used herein is for the purpose of describing particular embodiments only and is not intended to be limiting. Notwithstanding, several definitions that apply throughout this document now will be presented.

As defined herein, term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "concurrently" means at approximately the same time.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "in response to" and "responsive to" mean responding or reacting readily to an action or event. Thus, if a second action is performed "in response to" or "responsive to" a first action, there is a causal relationship between an occurrence of the first action and an occurrence of the second action. The terms "in response to" and "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the "user" means a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more operations or instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   searching, by a communications device that communicates via a cellular network, for streaming content that is broadcast via broadcast signals over a broadcast network as the communication device is receiving the streaming content over the cellular network from a cellular network provider;
   responsive to identifying, based on the searching, a within-range broadcast source broadcasting the streaming content via broadcast signals, causing the communications device to receive the streaming content via the broadcast signals over the broadcast network and cease receiving the streaming content via the cellular network;
   notifying the cellular network provider that the communications device has ceased receiving the streaming content; and
   receiving, responsive to the notifying, personalized content over the cellular network from the cellular network provider.

2. The method of claim 1, wherein
   the streaming content comprises general content,
   the communications device is configured to concurrently present the general content received via the broadcast network and the personalized content received via the cellular network, and
   the personalized content is generated by the cellular network provider, responsive to the notifying, to supplement the general content.

3. The method of claim 1, wherein
   the identifying comprises determining a channel over which the broadcast signals are being broadcasted.

4. The method of claim 1, wherein
   the identifying comprises comparing indicia associated with a channel over which the broadcast signals are being broadcasted and indicia associated with the streaming content the communication device is receiving over the cellular network.

5. The method of claim 1, wherein
   the searching is initiated in response to detecting the communications device receiving the streaming content via a cellular network.

6. The method of claim 1, wherein
   the searching is initiated in response to detecting a request conveyed from the communications device over the cellular network requesting access to the streaming content.

7. The method of claim 1, wherein
   the communications device is configured to receive broadcast signals transmitted according to ATSC 3.0 standards.

8. A communication device, comprising:
   a processor configured to initiate operations including:
   searching for streaming content that is broadcast via broadcast signals over a broadcast network as the communications device is receiving the streaming content over a cellular network from a cellular network provider;
   responsive to identifying, based on the searching, a within-range broadcast source broadcasting the streaming content via broadcast signals, causing the communications device to receive the streaming content via the broadcast signals over the broadcast network and cease receiving the streaming content via the cellular network;
   notifying the cellular network provider that the communications device has ceased receiving the streaming content; and
   receiving, responsive to the notifying, personalized content over the cellular network from the cellular network provider.

9. The system of claim 8, wherein
   the streaming content comprises general content, the communications device is configured to concurrently present the general content received via the broadcast network and the personalized content received via the cellular network, and the personalized content is generated by the cellular network provider, responsive to the notifying, to supplement the general content.

10. The system of claim 8, wherein
the identifying comprises determining a channel over which the broadcast signals are being broadcasted.

11. The system of claim 8, wherein
the identifying comprises comparing indicia associated with a channel over which the broadcast signals are being broadcasted and indicia associated with the streaming content the communications device is receiving over the cellular network.

12. The system of claim 8, wherein
the searching is initiated in response to detecting the communications device receiving the streaming content via a cellular network.

13. The system of claim 8, wherein
the searching is initiated in response to detecting a request conveyed from the communications device over the cellular network requesting access to the streaming content.

14. The system of claim 8, wherein
the communications device is configured to receive broadcast signals transmitted according to ATSC 3.0 standards.

15. A computer program product comprising
one or more computer readable storage media having program instructions embodied therewith, the program instructions executable by a processor of a communications device to cause the processor to initiate operations comprising:

searching for streaming content that is broadcast via broadcast signals over a broadcast network as the communications device is receiving the streaming content over a cellular network from a cellular network provider;

responsive to identifying, based on the searching, a within-range broadcast source broadcasting the streaming content via broadcast signals, causing the communications device to receive the streaming content via the broadcast signals over the broadcast network and cease receiving the streaming content via the cellular network;

notifying the cellular network provider that the communications device has ceased receiving the streaming content; and receiving, responsive to the notifying, personalized content over the cellular network from the cellular network provider.

16. The computer program product of claim 15, wherein
the streaming content comprises general content,
the communications device is configured to concurrently present the general content received via the broadcast network and the personalized content received via the cellular network, and the personalized content is generated by the cellular network provider, responsive to the notifying, to supplement the general content.

17. The computer program product of claim 15, wherein
the identifying comprises determining a channel over which the broadcast signals are being broadcasted.

18. The computer program product of claim 15, wherein
the identifying comprises comparing indicia associated with a channel over which the broadcast signals are being broadcasted and indicia associated with the streaming content the communications device is receiving over the cellular network.

19. The computer program product of claim 15, wherein
the searching is initiated in response to detecting the communications device receiving the streaming content via a cellular network.

20. The computer program product of claim 15, wherein
the searching is initiated in response to detecting a request conveyed from the communications device over the cellular network requesting access to the streaming content.

21. The computer program product of claim 15, wherein
the communications device is configured to receive broadcast signals transmitted according to ATSC 3.0 standards.

* * * * *